United States Patent [19]
van Gils

[11] 3,962,011

[45] June 8, 1976

[54] COMPOSITE OF POLYAMINE BONDED TO RUBBER AND METHOD FOR MAKING THE SAME

[75] Inventor: Gerard E. van Gils, Tallmadge, Ohio

[73] Assignee: The General Tire & Rubber Company, Akron, Ohio

[22] Filed: Oct. 21, 1974

[21] Appl. No.: 516,311

Related U.S. Application Data

[62] Division of Ser. No. 316,206, Dec. 18, 1972, Pat. No. 3,872,937.

[52] U.S. Cl. .............................. 156/110 A; 156/315; 156/331; 156/330; 156/333; 260/29.2 N; 427/407; 427/412; 428/378; 428/395
[51] Int. Cl.² ......................... B29H 5/02; C09J 5/04
[58] Field of Search ............................ 117/76 T, 77; 156/110 A, 315, 331, 166, 330, 310, 333, 335; 161/184; 260/29.2 EP, 29.2 N, 836, 846, 29.3; 427/386, 412, 390, 407, 434; 428/246, 395, 378

[56] References Cited
UNITED STATES PATENTS

| | | |
|---|---|---|
| 2,902,398 | 9/1959 | Schroeder ........................... 156/315 |
| 3,390,037 | 6/1968 | Christie .............................. 156/310 |
| 3,423,230 | 1/1969 | Georges ............................. 117/62.2 |
| 3,464,878 | 9/1969 | Schwarz ............................. 156/330 |
| 3,537,932 | 11/1970 | Schrode ............................. 156/310 |
| 3,660,202 | 5/1972 | Edington et al. ................... 156/335 |
| 3,861,980 | 1/1975 | Wise .................................. 156/331 |

*Primary Examiner*—Douglas J. Drummond
*Assistant Examiner*—J. J. Gallagher

[57] ABSTRACT

Rubber compounds are readily bonded to nylon or polyamides, particularly tire cords of polyamides in which a high proportion of the amide linkages are attached directly to aromatic rings, using a two-step dip process in which the first dip comprises a liquid dispersion or solution of an epoxide having an average of from about two to four epoxide groups per molecule and a molecular weight up to about 600 and the second dip comprises an aqueous dispersion of a mixture of a major amount of a rubbery vinyl pyridine copolymer and a minor amount of a heat reactable 2,6-bis(2,4-dihydroxy phenylmethyl)-4-chlorophenol composition. High H-adhesions are obtained with this process. It is particularly useful for the bonding to rubber compounds of crystalline polyamides having a large number of aromatic groups in the polymeric structure, e.g., "Fiber B".

9 Claims, No Drawings

COMPOSITE OF POLYAMINE BONDED TO RUBBER AND METHOD FOR MAKING THE SAME

This application is a division of copending U.S. patent application Ser. No. 316,206 filed Dec. 18, 1972, now U.S. Pat. No. 3,827,937 granted Mar. 25, 1975.

OBJECTS

An object of this invention is to provide composite articles containing polyamide reinforcing elements, e.g., such as those used in the carcass plies of tires, having a minor amount of a two-dip adhesive so that the adhesive containing elements may subsequently be bonded to rubber on curing and being characterized by exhibiting high cord H-adhesions. A further object is to provide a method for bonding polyamide fibers, cords and so forth to rubber compounds using a two-step dipping process and the product of said method. These and other objects and advantages of the present invention will become more apparent to those skilled in the art from the following detailed description and working examples.

SUMMARY OF THE INVENTION

According to the present invention it has been discovered that polyamide reinforcing elements can readily be bonded or adhered to curable rubbery compounds by dipping the elements in a first dip consisting essentially of a liquid dispersion or solution of a minor amount of an epoxide having an average of from about two to four epoxide groups per molecule and having a molecular weight up to about 600, drying said dipped element, dipping said dried polyepoxide treated element in a second dip consisting essentially of an aqueous alkaline dispersion of a minor amount of a mixture of a major amount of a rubbery vinyl pyridine copolymer and a minor amount of a heat reactable 2,6-bis(2,4-dihydroxy phenylmethyl)-4-chlorophenol composition, drying the same, and combining said twice dipped and twice dried element with a vulcanizable rubber compound and vulcanizing the same.

Polyamide reinforcing elements treated in this fashion exhibit high H-adhesion values.

DISCUSSION OF DETAILS AND PREFERRED EMBODIMENTS

The polyamide, or nylon, reinforcing element of the present invention can be in the form of monofilament, fibers, yarn, tow, twisted yarn, cord or fabric. The polyamide may be an aromatic polyamide, an aliphatic polyamide, or a polyamide containing both aliphatic and aromatic units. These long chain polymeric amides are capable of being formed into filaments and have recurring amide groups as an integral part of the main polymer chain. The polyamide ingredient can be a homopolymer, block or random copolymer, or a mixture of two or more such polymers. The polyamide will usually have both crystalline and amorphous regions. Groups other than amide, respectively, may be present in minor amounts in these polymers, such groups including: carbonate, urea, urethane, ether, ketone, imidazole, oxazole, and other oxygen-containing moieties.

In general, these high molecular weight polyamides are obtained by reacting polyamines, such as the alpha, omega-diamines, like 1,6-hexamethylene diamine, 1,5-pentamethylene diamine and 1,8-octamethylene diamine, with polycarboxylic acids, such as adipic acid, succinic acid, phthalic acid, chlorophthalic acid and the like. The polyamides may also be prepared by polymerization of aminocarboxylic acids, such as aminocaproic acid. Polyamides from caprolactam and p-aminobenzoic acid also can be used.

The high molecular weight aromatic or substantially aromatic polyamides are preferred and are obtained by condensation of metaphenylene diamines with isophthalic acid or paraphenylene diamines with terephthalic acids or m, p, or o-benzamides or mixtures of the above isomeric amines with isomeric acids. It is also possible to make polyamides using the above mentioned isomers with substituents on the phenyl groups, halogen (—Cl), alkyl (CH$_3$—), etc., or to use biphenyl acids with diamines or aromatic diamines and/or diacids in which the aromatic nuclei are spaced by:

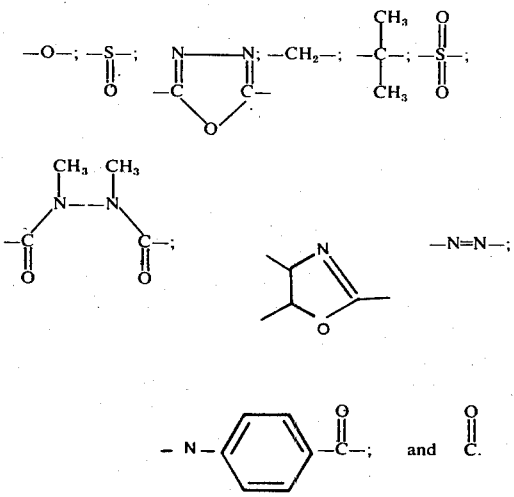

Instead of phenylene groups, the polymers can partly or totally contain heterocyclic rings.

Examples of such materials are polyhexamethylene adipamide, copolymers of metaphenylene diamine and terephthalic or isophthalic acid or acid chloride, poly [bis-(4-amino-cyclohexyl)methanedodecamide], poly para-phenylene terephthalamide from phenylene-diamine and terephthaloyl chloride, poly(hexamethylene terephthalamide), poly-m, or p-benzamide and the like. Examples of commercially available aliphatic polyamides are nylon 6 and nylon 66. Examples of aromatic polyamides are "Nomex" and "Fiber B" (the "aromids" or "aramids").

More preferred are the linear or long chain synthetic aromatic polyamides in which at least 85% of the amide linkages are attached directly to aromatic rings, which are highly crystalline, and which have a modulus (grams/denier) of at least about 350.

Polyamides and methods for making them are well known as shown by U.S. Pat. Nos. 2,071,250; 2,071,253; 2,130,948; 2,241,321; 3,006,899; 3,094,511; 3,225,011; 3,232,910; 3,308,007; 3,464,878; 3,536,651; 3,629,053; 3,632,548; 3,660,361; and 3,673,143; Belgian Pat. No. 726,050; French Pat. No. 1,526,745; British Pat. No. 1,259,788; "Mechanics of Pneumatic Tires," Clark, National Bureau of Standards Monograph 122, U.S. Department of Commerce, issue Nov., 1971, pages 225 to 238; and "Rubber World," April, 1972, page 56. More information on polyamides, especially those for use in making fibers, can be found in "Encyclopedia of Polymer Science and Technology," Interscience Publishers division of John Wiley and Sons, Inc., New York, 1969, Volume 10, pages 347 to 460 and, more particularity with respect to high modulus fibers, in "Chem Tech," Preston, November, 1971, pages 664 to 671; "American Chem. Soc. Polym. Prepr.," Bach et al, 11(1), 334 (1970); "Journal of Polymer Science," Frazer et al, Part A, Volume 2, pages 1147 to 1169 (1964); and the "Federal Register," Volume 37, No. 120, June 21, 1972, pages 12243 and 12244.

FIRST DIP

The first polyamide tire cord dip comprises an aqueous solution or dispersion or an organic solution or dispersion of from about 0.3 to 10% by weight solids of an epoxide having an average of from about 2 to 4 epoxide groups per molecule. The amount of the polyepoxide can be adjusted within these limits to obtain the desired viscosity of the dispersion or solution as well as the amount of polyepoxide to obtain the desired final pickup (after drying) of polyepoxide solids on the polyamide cord and of course the desired adhesion. The amount of solids of polyepoxide deposited on the cord can vary from about 0.01 to 1.5% by weight. Examples of suitable epoxides are triglycidyl isocyanurate; 1-epoxyethyl-3,4-epoxycyclohexane,; vinyl cyclohexene dioxide; ethylene glycol diglycidic ether; 1,2-propanediol diglycidic ether; 1,3-propanedioldiglycidic ether; 1,3-butanedioldiglycidic ether; 1,4-butanediol diglycidic ether; 2,3-butanedioldiglycidic ether; and the glycidyl ethers of glycerol, erythritol, pentaerythritol, and sorbitol which contain two to three glycidic groups per molecule, for example, the diglycidyl ether of glycerol, the triglycidyl ether of hexanetriol and so forth. Still other polyepoxides can be used such as 3,4-epoxycyclohexyl methyl-3,4-epoxy cyclohexane carboxylate; 3-(3,4-epoxycyclohexane)-8,9-epoxy-2,4-dioxaspiro[5.5]-undecane; bis(2,3-epoxycyclopentyl)ether; bis(3,4-epoxy-6-methylcyclohexyl methyl) adipate; the diglycidyl ether of polyethylene glycol 400, polyallyl glycidyl ether, the diglycidyl ether of bisphenol A, epoxy resorcinol ethers, and the like. Mixtures of these polyepoxides can be used. These polyepoxides have a molecular weight of up to about 600. Preferred are the water soluble polyglycidyl ethers including the polyhydroxylated saturated aliphatic hydrocarbons of from 2 to 10 carbon atoms; especially from those hydrocarbons having from 2 to 3 hydroxyl groups. These materials are generally well known and can be made by methods disclosed in the prior art as shown by:

a. "Encyclopedia of Chemical Technology," 2nd Ed., Kirk-Othmer, Volume 8, Interscience Publishers a division of John Wiley & Sons, Inc., New York, 1965, pages 238 to 312;

b. "Encyclopedia of Polymer Science and Technology," First Edition, Volume 6, Interscience Publishers a division of John Wiley & Sons, Inc., New York, 1967, pages 83 to 102, 106, 108, 146 to 148, 168 to 170 and 209 to 222;

c. "Cyclic Monomers," Frisch, Wiley-Interscience a division of John Wiley & Sons, Inc., New York, 1972, pages 1 to 54;

d. "Polyethers," Part I Polyalkylene Oxides and Other Polyethers, Gaylord, Interscience Publishers a division of John Wiley & Sons, Inc., New York, 1963, pages 83 to 102; and e. "Epoxy Resins," Lee and Neville, McGraw-Hill Book Company, Inc., New York, 1957.

Catalysts can be added to the first dip to promote self-polymerization of the polyepoxide, for example, to permit the epoxy molecules to co-react with one another without the catalysts acting as direct crosslinking agents, chain extenders, or without entering into the polyepoxide crosslinked molecule. The catalysts are preferably water or organic solvent soluble. Unlike hardeners or crosslinking agents which are used in stoichiometric ratios, the catalysts are used in concentrations which may be varied in certain ranges depending on the amount of polyepoxide used and the heat treating times and temperatures. Usually they are employed in a minor amount by weight as compared to the amount by weight of the polyepoxide used. In general it has been found that the use of catalysts in the first dip of this invention can materially reduce the time of the heat treatment of the cord following the first dip. Examples of suitable water soluble catalysts are quaternary ammonium hydroxides and tertiary amines such as tetramethyl ammonium hydroxide, tetraethyl ammonium hydroxide, triethylamine, trimethyl amine, tributyl amine, tripropyl amine, butyl dimethyl amine, dimethyl isobutyl amine, and the like and mixtures thereof.

The solvent or dispersant for the epoxide can be water, methanol, ethanol, propanol, benzene, toluene and the like and mixtures thereof and which will not adversely affect the polyamide fiber. Organic solvents for epoxides are well known. Emulsifying agents, especially non ionic emulsifying agents, can be used to make aqueous or organic dispersions. It is much preferred to use aqueous solutions of the epoxides.

SECOND DIP

The type of rubber latex used in the polyamide tire cord second dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight of butadiene-1,3, 7 to 32% styrene and 7 to 22% of 2-vinyl pyridine. Excellent results are obtained using a latex of a terpolymer of about 70% by weight of butadiene-1,3, 15% styrene and 15% 2-vinyl pyridine having a total solids content of around 30 to 50% by weight. Also, blends of latices may be used such as a blend of a butadiene-1,3/2-vinyl pyridine rubbery copolymer latex and a butadiene-1,3/styrene rubbery copolymer latex or a blend of a butadiene-1,3/styrene/2-vinyl pyridene rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers should be compatible to avoid coagulation on blending or mixing of the latices. Further disclosures of rubbery vinyl pyridine copolymer latices may be found in U.S. Pat. Nos. 2,615,826 and 3,437,122.

The heat reactable 2,6-bis(2,4-dihydroxy phenyl methyl)-4-chlorophenol composition used in the dip of the present invention is made by the process of first reacting about 2 mols of formaldehyde with 1 mol of para-chlorphenol to provide 2,6-dimethylol-4-chlorphenol which then is reacted with about 2 mols of resorcinol to give the heat reactable bis(dihydroxy phenylmethyl)-chlorophenol composition. The final product does not need to be treated to remove unused starting materials and by-products. It is preferably used as made without subsequent expensive purification steps. The product as produced is substantially heat reactable 2,6-bis(2,4-dihydroxy phenylmethyl)-4-chlorphenol composition having an average molecular weight of up to about 800 and a melting point of up to about 240°C. It is added to or mixed with the latex of the rubbery vinyl pyridine copolymer in the form of a solution 5–30% solids in water containing $NH_3$ sufficient to render the solution alkaline, usually about 0.5 to 7.5%. More information on how to prepare the heat reactable 2,6-bis(2,4-dihydroxy phenyl methyl)-4-chlorophenol composition is shown by Mather, "Development of a Polyester-Rubber Adhesive", British Polymer Journal, Volume 3, March, 1971, pages 58 to 62 and U.S. Pat. No. 3,660,202. The chlorophenolic composition is heat reactable so that it can react with itself, the rubber, and possibly the cord.

Water is used in an amount sufficient to provide for the desired dispersion of the rubber or latex particles, for the solution of the heat reactable chlorophenolic composition and for the proper solids content to get the necessary pick-up of solids on and penetration between the fibers of the polyepoxide treated cord.

The second dip thus consists essentially of an aqueous dispersion of the rubbery vinyl pyridine copolymer latex and the heat reactable chlorophenolic composition, the copolymer and heat reactable chlorophenolic composition being present in a total amount (as dry solids, dispersed or dissolved in the water) of from about 10 to 30% by weight. The ratio (dry) of the rubbery copolymer to the heat reactable chlorophenolic composition in the dip is from about 100:10 to 100:75 parts by weight, preferably from about 100:35 to 100:50 parts by weight. Sufficient alkaline material is present from the heat reactable chlorophenolic composition solution to render the dip alkaline or additional alkaline material such as $NH_4OH$ can be added to achieve this purpose and to prevent premature coagulation of the rubbery copolymer and to maintain the heat reactable chlorophenolic composition in solution. Since the amount of each compound may vary, the amount of alkaline material required can also vary.

In order to provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138-67.

In order to apply the adhesive dips to the polyamide cords in a reliable manner, the cords are fed through the adhesive dip baths, the first dip being the bath containing the polyepoxide and the second dip being the bath containing the rubber and the heat reactable chlorophenolic composition, while being maintained under a small predetermined tension and into a drying oven after each dip where they are stretched and dried under a predetermined tension (about 2% to prevent sagging). After the first dip, the cords are dried and cooled, dipped in the second dip and again dried and cooled. Also, as the cords leave the ovens they enter cooling zones where they are air cooled before the tension is released. In each case the adhesive-coated cords leaving the dips are dried in ovens at from about 300° to 500°F., or at a temperature below the decomposition point of the cord, for from about 30–150 seconds while being stretched 2 percent to heat set each adhesive on the cord. The time the cord remains in each dip is about a second or so or at least for a period of time sufficient to allow wetting of the cord and penetration of the fibers of the cord.

The single-cord H-pull test is then employed to determine the static adhesion of the dried adhesive coated polyamide fiber cords to rubber. In each case the rubber test specimens are made from the same standard type rubber composition using the following recipe:

| Material | Parts by Weight |
| --- | --- |
| Natural Rubber | 46.64 |
| Butadiene-Styrene rubbery copolymer, average 23.5% bound styrene (SBR-1500) | 38.5 |
| Polybutadiene (solution polymerized BD, about 93% cis-1,4, Raw Mooney ML-4 at 212°F. about 40–50) | 15.0 |
| Carbon black, fast extrusion furnace | 45.0 |
| Hydrated silica (Hi-Sil 233, Pittsburgh Plate Glass) | 15.0 |
| BLE-25 antioxidant (a high temperature reaction product of diphenylamine and acetone, Naugatuck Chemical Division of Uniroyal) | 2.0 |
| Processing oil (a blend of highly aromatic petroleum fractions) | 5.0 |
| Zinc Oxide | 3.0 |
| Stearic Acid | 1.5 |
| Cahedur RL (a 1:1 mixture of resorcinol and Cahedur A (the pentamethyl ether of hexamethylol melamine) which is a colorless, viscous liquid which liberates formaldehyde on heating. Naftone, Inc.) | 4.7 |
| N-tert-butyl-2-benzothiazole-sulfenamide (Santocure NS, Monsanto Chemical Co.) | 1.2 |
| Sulfur | 3.0 |

In every case the cords to be tested are placed in parallel positions in a multiple-strand mold of the type described in the single-cord H-pull adhesion test designated ASTM D 2138-67, the mold is filled with unvulcanized rubber of the above composition, the cords being maintained under a tension of 50 grams each, and the rubber is cured 30 minutes at around 315°F. to the elastic state. Each rubber test specimen is ¼ inch thick and has a ⅜ inch cord embedment.

After the rubber has been cured, the hot cured rubber piece is removed from the mold, cooled to about room temperature (70° to 77°F.), and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an Instron tester provided with specimen grips.

The maximum force in pounds required to separate the cord from the rubber is the H-adhesion value.

While the double dip adhesive containing polyamide reinforcing elements can be adhered to a vulcanizable blend of natural rubber, polybutadiene rubber, and rubbery butadiene-styrene copolymer by curing the same in combination together, it is apparent that said adhesive containing polyamide reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives, rubber compounding ingredients and the like well known to those skilled in the art for the particular rubbers being employed.

Polyamide cords or fabric coated with the double dip adhesive of the present invention can have from about 3 to 7% by weight (dry) total solids from the two adhesive dips on the cord based on the weight of the cord and can be used in the manufacture of carcasses, belts, flippers and chafers of radial, bias, or belted-bias passenger car tires, truck tires, motorcycle and bicycle tires, off-the-road tires, airplane tires, transmission belts, V-belts, conveyor belts, hose, gaskets, rubbers, tarpaulins and the like.

The following examples will serve to illustrate the invention with more particularity to those skilled in the art. In these examples the parts are parts by weight unless otherwise indicated.

EXAMPLE I

Polyamide (1) tire cords were dipped in a first dip, heat treated (under tension, about 2%), cooled, dipped in a second dip, heat treated (under tension, about 2%), cooled, embedded in the above rubber stock, molded and cured for 30 minutes at 315°F. in accordance with the H-adhesion test described supra. After curing, the assembly was removed from the mold, cooled and the cord adhesion was determined according to said H-adhesion test. The following H-adhesions were obtained for the cords treated as described above.

Table I

| Run No. | First Dip | Heat Treatment In Air | Second Dip | Heat Treatment In Air | H-Adhesion At Room Temp. (about 25°C.), lbs. |
|---|---|---|---|---|---|
| 1 | A | 470°F./ 60 sec. | C | 470°F./ 60 sec. | 61 |
| 2 | B | '' | C | '' | 61 |
| 3 | B | '' | D | '' | 69 |

Dip A comprises an aqueous solution of a blocked diisocyanate, a water soluble epoxy resin and 2-pyrrolidone.

Dip B comprises an aqueous solution containing 2% by weight (as dissolved solids) of diglycidyl glycerol.

Dip C comprises an aqueous dispersion of about 100 parts by weight of a rubbery terpolymer of 70 parts by weight of butadiene-1,3, 15 latex:pH parts by weight of styrene and 15 parts by weight of 2-vinyl pyridine; 14.54 parts by weight of a resorcinol-formaldehyde resin (mol ratio of resorcinol to formaldehyde about 1:2), 0.25 part by weight of NaOH, 3.16 parts by weight of $NH_3$, and 463 parts by weight of water. The R-F resin is made in the usual way by the reaction of resorcinol and formaldehyde in water containing the NaOH. It is aged before mixing with the rubbery terpolymer (in the form of a latex-pH of about 10.5–10.7, 41% by weight total solids, about 38% rubber solids balance surfactant, stabilizer and so forth) as is well known in the art. The rubbery terpolymer is prepared by aqueous emulsion free-radical polymerization of the monomers and is used in the form of a latex. After aging, the aqueous R-F resin solution is mixed with the latex which has been treated with the ammonia.

Dip D comprises about 41 parts by weight of a rubbery terpolymer of 70 parts by weight of butadiene-1,3, 15 parts by weight of styrene and 15 parts by weight of 2-vinyl pyridine; 20 parts by weight of heat reactable 2,6-bis(2,4-dihydroxyphenylmethyl)-4-chlorophenol composition which is the reaction product of formaldehyde, parachlorophenol and resorcinol generally supplied as an aqueous solution containing about 5.5% by weight of $NH_3$ and 20% by weight of said heat reactable chlorophenolic composition; 5 parts by weight of $NH_3$; and 234 parts by weight of water. The terpolymer is prepared as discussed above with respect to Dip C and is mixed as a 41% solids latex with an aqueous solution of the chlorophenol (20%) solids in $H_2O$ containing 5% $NH_3$. Additional $H_2O$ is added to get the desired viscosity.

When Run 2 was repeated except that the first dip was omitted, the H-adhesion value at room temperature was 49 lbs.

When Run 2 was repeated except that the second dip was omitted, there was no measurable H-adhesion value at room temperature.

When Run 3 was repeated except that the first dip was omitted, the H-adhesion value at room temperature was 43 lbs.

When Run 3 was repeated except that the first dip was omitted and 1.6 parts by weight of diglycidyl glycerol was added to Dip D, the H-adhesion at room temperature was 40 lbs.

When Run 2 was repeated except that the first dip was omitted and diglycidyl glycerol was added to the second dip, the H-adhesion of the cord at room temperature was 39 lbs. In this case to 100 parts by weight of Dip C there were added 4 parts by weight of a 10% by weight solution in water of diglycidyl glycerol.

Note: (1) du Pont Fiber B (1500/3), a long chain synthetic aromatic polyamide (polyparaphenyleneterephthalamide) in which at least 85% of the amide linkages are attached directly to aromatic rings, which is highly crystalline, and which has a denier of 4500, a breaking strength of 180 lbs., a tenacity of 18 grams/denier, an elongation at break of 4%, a modulus of 350 grams/denier, a loop tenacity of 8.0 grams/denier, a growth and creep of 0.49% (1gpd, 30 minutes, 75°F.), and a 160°C. shrinkage of 0%.

EXAMPLE II

The method of this example was the same as that of Example I, above, except that only single dip compositions were employed. The compositions of the dips and the H-adhesion values obtained at room temperature are shown below:

| Composition | Parts by Weight | |
|---|---|---|
| | Run No. 21 | Run No. 22 |
| Latex of rubbery terpolymer of 70 BDN, 15 STY and 15 2-vinyl pyridine, 41% solids (See Example I) | 100 | 100 |
| Diglycidyl glycerol (dry) | 5 | 10 |
| H-adhesion, pounds | 49 | 50 |

EXAMPLE III

The method of this example was the same as that of Example I, above, Run 3, except that tetramethyl ammonium hydroxide was added to three of the first dips:

Table II

| Run No. | First Dip | Heat Treatment In Air | Second Dip | Heat Treatment In Air | H-adhesion, in Air, pounds | |
|---|---|---|---|---|---|---|
| | | | | | Room Temp. | 250°F. |
| 31 | B | 350°F./ 90 sec. | D | 350°F./ 90 sec. | 66 | 45 |
| 32 | B + 0.25% by wt. (dry) TMAH(2) | " | D | " | 69 | 50 |
| 33 | B + 0.5% by wt. (dry) TMAH(2) | " | D | " | 69 | 47 |
| 34 | B + 1.0% by wt. (dry) TMAH(2) | " | D | " | 68 | 48 |

(2)tetramethylammonium hydroxide, based on total weight of aqueous dip. TMAH supplied as a 24% solution in methanol.

This example shows that lower heat treatment temperatures can be used with a catalyst for the polyepoxide which does not react with the polyepoxide.

EXAMPLE IV

The method of this Example was the same as that of Example I, above, Run 3, except that the Dip B contained additionally 0.25% by weight of tetramethylammonium hydroxide (see Example III, above) and that after each dip the cord was heat treated in air at 350°F. for 90 seconds. An unaged test specimen or assembly had an H-adhesion value at room temperature of 64.0 lbs. The H-adhesion value at room temperature for an assembly which had been aged in dry $N_2$ at 300°F. for 24 hours was 57.5 lbs. The H-adhesion value at room temperature for an assembly aged in steam (assembly placed in closed tube containing some $H_2O$) at 300°F. for 24 hours was 54.6 lbs.

EXAMPLE V

The method of this example was the same as that of Example I, above, Run 3, except as noted below:

| Run No. | First Dip | Second Dip | H-adhesion, lbs., Room Temp. (about 25°C.) |
|---|---|---|---|
| 41 | Same as Dip B but only 1% by weight of the diepoxide | Dip D | 65.9 |
| 42 | Dip B | Dip D | 67.4 |
| 43 | 1% by weight of butanediol diglycidylether in water (to make 100 parts by weight of aqueous epoxide solution) | Dip D | 61.5 |
| 44 | 1% by wt. of Shell Chem. Co. Epon 812(3) in water(to make 100 parts by wt. of aqueous epoxide solution) | Dip D | 66.5 |
| 45 | 1% by wt. of vinyl cyclohexene dioxide in $H_2O$ (to make 100 parts by wt. of aqueous | Dip D | 62.9 |

| Run No. | First Dip | Second Dip | -continued H-adhesion, lbs., Room Temp. (about 25°C.) |
|---|---|---|---|
| 46 | epoxide solution) 1% Dow Chem. Co. XD-7160(4) in H₂O (to make 100 parts by wt. of aqueous epoxide solution) | Dip D | 65.9 |

Notes:
(3) Water soluble epoxide derivative of glycerol having an epoxide equivalent of 150 to 170 and a viscosity of 120 to 200 centipoises.
(4) Water soluble epoxide derivative of glycerol having an epoxide equivalent of 143-180 and a viscosity of 250-500 centipoises.

After each dip the cords were heat treated at 350°F. for 90 seconds. Also, all of the first dips contained 0.25% by weight of tetramethylammonium hydroxide (see Example III, above).

This example shows that other water soluble polyepoxides can be used in the practice of the present invention.

EXAMPLE VI

The method of this example was the same as that of Example I, above, Run 3, except as noted below:

| Run No. | First Dip | Heat Treatment In Air | Second Dip | Heat Treatment In Air | H-Adhesion at Room Temperature (about 25°C.) lbs. |
|---|---|---|---|---|---|
| 51 | 2½% (solids by wt.) aqueous emulsion of Epon 828(5) | 450°F./ 60 sec. | D | 450°F./ 60 sec. | 65 |
| 52 | 2½% (solids by wt.) aqueous emulsion of ERE 1359(6) | 450°F./ 60 sec. | D | 450°F./ 60 sec. | 62 |
| 53 | 1% (solids by wt.) aqueous solution of diglycidyl glycerol | 450°F./ 60 sec. | D | 450°F./ 60 sec. | 67 |
| 54 | None | — | D | 450°F./ 60 sec. | 49 |

Notes:
(5) Shell's Epon 828, the water insoluble diglycidyl ether of bisphenol A having an epoxide equivalent of about 185-192, a viscosity at 25°C. of about 100-160 poises and a molecular weight of about 350-400. Emulsion made of 10 parts by weight of emulsifier (Tween 40) on 100 parts by weight of epoxide diluted with water to give 2½ % by weight of solids. Tween 40 is a non-ionic polyoxyethylene sorbitan monopalmitate (Atlas Chemical Ind., Inc.).
(6) Ciba's ERE 1359, a water insoluble epoxy resorcinol ether resin having an epoxide equivalent of about 127 and a viscosity (cps) at 25°C. of 300-500. The emulsion was made in the same way as (5) above except that only 5 parts by weight of the emulsifier were used.

The results of these runs show that non-water soluble epoxides are as effective as the water soluble epoxides.

EXAMPLE VII

The method of this example was the same as that of Example I, above, Run 3, except as noted below:

| Run No. | First Dip | Heat Treatment In Air | Second Dip | Heat Treatment In Air | H-Adhesion at Room Temperature (about 25°C.), lbs. |
|---|---|---|---|---|---|
| 61 | 1% aqueous solution of polyallyl glycidyl ether(7) | 450°F./ 60 sec. | D | 450°F./ 60 sec. | 60 |
| 62 | 1 gram of Epon 828 dissolved in 100 grams of 2B ethanol (The Merck Index, 7th | 450°F./ 60 sec. | D | 450°F./ 60 sec. | 59 |

| Run No. | First Dip | Heat Treatment In Air | Second Dip | Heat Treatment In Air | H-Adhesion at Room Temperature (about 25°C.), lbs. |
|---|---|---|---|---|---|
| | Ed.) | | | | |

(7)3 grams of polyallyl glycidyl ether having a molecular weight of about 520 and an average of about 3.5 epoxy groups per molecule was stirred vigorously in water and the insoluble portion (about 2 grams) was filtered off.

This run shows that organic solutions can be used to treat the polyamide cord.

What is claimed is:

1. A method for adhering a polyamide reinforcing element to a rubber compound which comprises dipping said element in a first dip consisting essentially of a liquid dispersion or suspension of a minor amount of an epoxide having an average of from about 2 to 4 epoxide groups per molecule and having a molecular weight up to about 600, drying said dipped element, dipping said dried polyepoxide treated element in a second dip consisting essentially of an aqueous alkaline dispersion of a minor amount of a mixture of a major amount of a rubbery vinyl pyridine copolymer and a minor amount of a heat reactable 2,6-bis(2,4-dihydroxy phenyl methyl)-4-chlorophenol composition, drying the same, and combining said twice dipped and twice dried element with a vulcanizable rubber compound and vulcanizing the same.

2. A method for adhering a polyamide reinforcing element to a rubber compound which comprises treating said element with a first composition consisting essentially of an aqueous solution containing from about 0.3 to 10% by weight as dissolved solids of a water soluble polyepoxide having an average of from about 2 to 4 epoxide groups per molecule and a molecular weight up to about 600, heat treating under slight tension said element containing said solution to remove the water, to heat set said polyepoxide on said element, and to deposit on said element from about 0.01 to 1.5% by weight of said polyepoxide based on the weight of said element, cooling and treating said heat treated polyepoxide containing element with a second composition consisting essentially of an aqueous alkaline dispersion of from about 10 to 30% by weight (as dry solids) of a rubbery vinyl pyridine copolymer and a heat reactable 2,6-bis (2,4-dihydroxyl phenyl methyl)-4-chlorophenol composition, the parts by weight ratio of said copolymer to said chlorophenol composition being from about 100:10 to 100:75, heat treating under slight tension said element from said second composition to remove the water, heat-set the solids from said second composition and to deposit on said element from both compositions a total of from about 3 to 7% by weight (solids), cooling said twice treated element, combining said cooled twice treated element with an unvulcanized vulcanizable rubber compound, and vulcanizing the same, said heat treatments being conducted at temperatures of from about 300° to 500°F. for from about 30 to 150 seconds.

3. A method according to claim 2 where said rubbery vinyl pyridine copolymer is a copolymer of from about 60 to 80% by weight of butadiene-1,3, from 7 to 32% by weight of styrene, and from 7 to 22% by weight of 2-vinyl pyridine.

4. A method according to claim 3 where said copolymer is a blend of a terpolymer of butadiene-1,3, styrene and 2-vinyl pyridine and a copolymer of butadiene-1,3 and styrene.

5. A method according to claim 3 where said polyamide reinforcing element is a cord of linear long chain synthetic aromatic poly(para phenylene terephthalamide) in which at least 85% of the amide linkages are attached directly to aromatic rings, which is highly crystalline, and which has a modulus (grams/denier) of at least about 350.

6. A method according to claim 2 where said first composition contains additionally a water-soluble catalyst for said polyepoxide, which does not cross link nor chain extend with said polyepoxide, and which is selected from the group consisting of quaternary ammonium hydroxides and tertiary amines.

7. A method according to claim 6 where said rubbery vinyl pyridine copolymer is a copolymer of from about 60 to 80% by weight of butadiene-1,3, from 7 to 32% by weight of styrene, and from 7 to 22% by weight of 2-vinyl pyridine.

8. A method according to claim 7 where said copolymer is a blend of a terpolymer of butadiene-1,3, styrene and 2-vinyl pyridine and a copolymer of butadiene-1,3 and styrene.

9. A method according to claim 7 where said polyamide reinforcing element is a cord of linear long chain synthetic aromatic poly(para phenylene terephthalamide) in which at least 85% of the amide linkages are attached directly to aromatic rings, which is highly crystalline, and which has a modulus (grams/denier) of at least about 350.

* * * * *